US010682656B2

(12) United States Patent
Peterson et al.

(10) Patent No.: US 10,682,656 B2
(45) Date of Patent: Jun. 16, 2020

(54) WASH HOOD FOR ABATEMENT EQUIPMENT AND METHOD OF WASHING

(71) Applicant: MEGTEC SYSTEMS, INC., De Pere, WI (US)

(72) Inventors: Justin Peterson, Green Bay, WI (US); Timothy Golden, Greenleaf, WI (US)

(73) Assignee: Durr Systems, Inc., Southfield, MI (US)

( * ) Notice: Subject to any disclaimer, the term of this patent is extended or adjusted under 35 U.S.C. 154(b) by 0 days.

(21) Appl. No.: 15/191,850

(22) Filed: Jun. 24, 2016

(65) Prior Publication Data

US 2017/0001204 A1    Jan. 5, 2017

Related U.S. Application Data

(60) Provisional application No. 62/186,798, filed on Jun. 30, 2015.

(51) Int. Cl.
| | |
|---|---|
| *B05B 1/18* | (2006.01) |
| *B08B 3/02* | (2006.01) |
| *B01D 53/00* | (2006.01) |
| *B01D 53/44* | (2006.01) |

(52) U.S. Cl.
CPC ............. *B05B 1/18* (2013.01); *B01D 53/005* (2013.01); *B01D 53/44* (2013.01); *B08B 3/024* (2013.01); *B01D 2257/708* (2013.01)

(58) Field of Classification Search
None
See application file for complete search history.

(56) References Cited

U.S. PATENT DOCUMENTS

| | | | | | |
|---|---|---|---|---|---|
| 5,509,972 | A | * | 4/1996 | Akazawa | B08B 9/023 134/26 |
| 2001/0042558 | A1 | * | 11/2001 | Rohrbacher | A47L 11/03 134/10 |
| 2014/0201903 | A1 | * | 7/2014 | Bronstein | E03C 1/063 4/615 |

FOREIGN PATENT DOCUMENTS

| | | |
|---|---|---|
| DE | 102005002735 A1 | 8/2006 |
| EP | 2186556 A1 | 5/2010 |
| WO | 2009/126987 A1 | 10/2009 |

OTHER PUBLICATIONS

European communication dated May 10, 2019 in corresponding European patent application No. 16177237.1.

* cited by examiner

*Primary Examiner* — Cristi J Tate-Sims
(74) *Attorney, Agent, or Firm* — Nields, Lemack & Frame, LLC

(57) ABSTRACT

Wash hood for washing contaminants from heat exchange media, and a method of washing media. The wash hood may include a housing containing a flow distributor such as a perforated member that facilitates uniform dispersing of fluid from the wash hood. The wash hood may include a fluid inlet for connection to a fluid source, such as water under pressure, and an outlet for dispersing or spraying the water towards the media to be cleaned.

10 Claims, 4 Drawing Sheets

WASH HOOD FOR ABATEMENT EQUIPMENT AND METHOD OF WASHING

BACKGROUND

Gas pollution abatement systems such as regenerative thermal oxidizers (RTOs) and recuperative thermal oxidizers (RCOs) are conventionally used for destroying volatile organic compounds (VOCs) in high flow, low concentration emissions from industrial and power plants. Such systems typically require high oxidation temperatures in order to achieve high VOC destruction. In RTO's for example, to achieve high heat recovery efficiency, the "dirty" process gas which is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated now "clean" gas is then directed out of the combustion zone and back through the heat exchanger column, or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Usually, a regenerative thermal oxidizer has at least two heat exchanger columns which alternately receive process and treated gases. This process is continuously carried out, allowing a large volume of process gas to be efficiently treated.

Over time, contaminants such as particulate matter can accumulate in the media beds of abatement equipment. This increases the pressure drop across the media beds, and leads to a reduction in the efficiency of the unit, both in terms of the power required for airflow through the unit, and the heat exchange efficiency of the media.

The use of electrostatic precipitators and cyclone dust collectors upstream of the abatement equipment can help reduce particulate accumulation. In addition, to the extent the contaminants are burnable (e.g., organic contaminants), a "bake out" procedure can be used to help rid the media of burnable contaminants. Typical bake out procedures involve the controlled heating of regions of the media bed to temperatures sufficient for destroying the burnable contaminants.

Water washing is another technique used to remove contaminants from media beds. This typically involves manually spraying the media bed with a fire hose or the like. More specifically, the abatement equipment is shut down and allowed to cool, and an operator enters the equipment above the media bed via an access opening. The operator then uses a fire hose or the like connected to a fluid source under pressure to spray the media bed in an effort to remove embedded contaminants.

It would be desirable to provide apparatus for water washing media that results in more uniform washing, limits the amount of water that is splashed on the equipment insulation and walls, and reduces operator error, operator's physical exertion, and the likelihood of injury.

SUMMARY

The problems of the prior art have been overcome by the embodiments disclosed herein, which provide a wash hood for washing contaminants from media, such as heat exchange media or the like, and a method of washing said heat exchange media or the like. In certain embodiments, the heat exchange media are structured media, such as monolithic blocks. In certain embodiments, the wash hood includes a housing containing a perforated member that facilitates uniform dispersing of fluid from the wash hood. In certain embodiments, the wash hood includes a fluid inlet for connection to a fluid source, such as water under pressure, and an outlet for dispersing or spraying the water towards the media to be cleaned.

One embodiment includes a wash hood comprising a hood body having a fluid inlet and a fluid outlet spaced from the fluid inlet, and a flow distributor in the hood body having a surface and a plurality of apertures, the number and size of which is effective to cause fluid to accumulate on the flow distributor surface and spread across the surface.

Another embodiment includes a method of washing heat exchange media inside gas abatement equipment, comprising providing inside the gas abatement equipment a wash hood comprising a hood body having a fluid inlet and a fluid outlet spaced from the fluid inlet, and a flow distributor in the hood body having a surface and a plurality of apertures; supplying wash fluid to the wash hood; positioning the wash hood over a first region of the heat exchange media; discharging the wash fluid from said wash hood fluid outlet to said first region of said heat exchange media; moving the wash hood to a second region of the heat exchange media; and discharging the wash fluid from the wash hood to the second region of the heat exchange media.

These and other non-limiting aspects and/or objects of the disclosure are more particularly described below. For better understanding of the embodiments disclosed herein, reference is made to the accompanying drawings and description forming a part of this disclosure.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION

Figure 1:
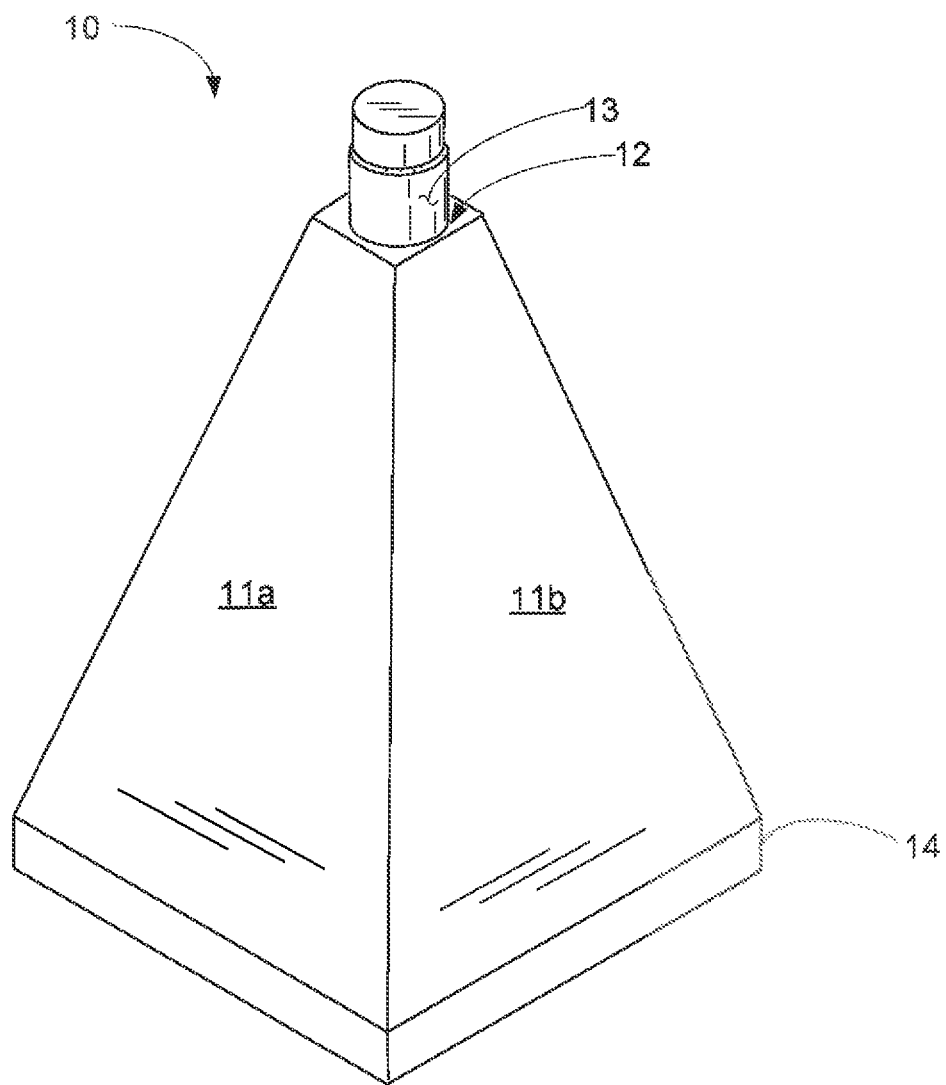
FIG. 1 is a perspective view of a wash hood in accordance with certain embodiments.
Figure 2:
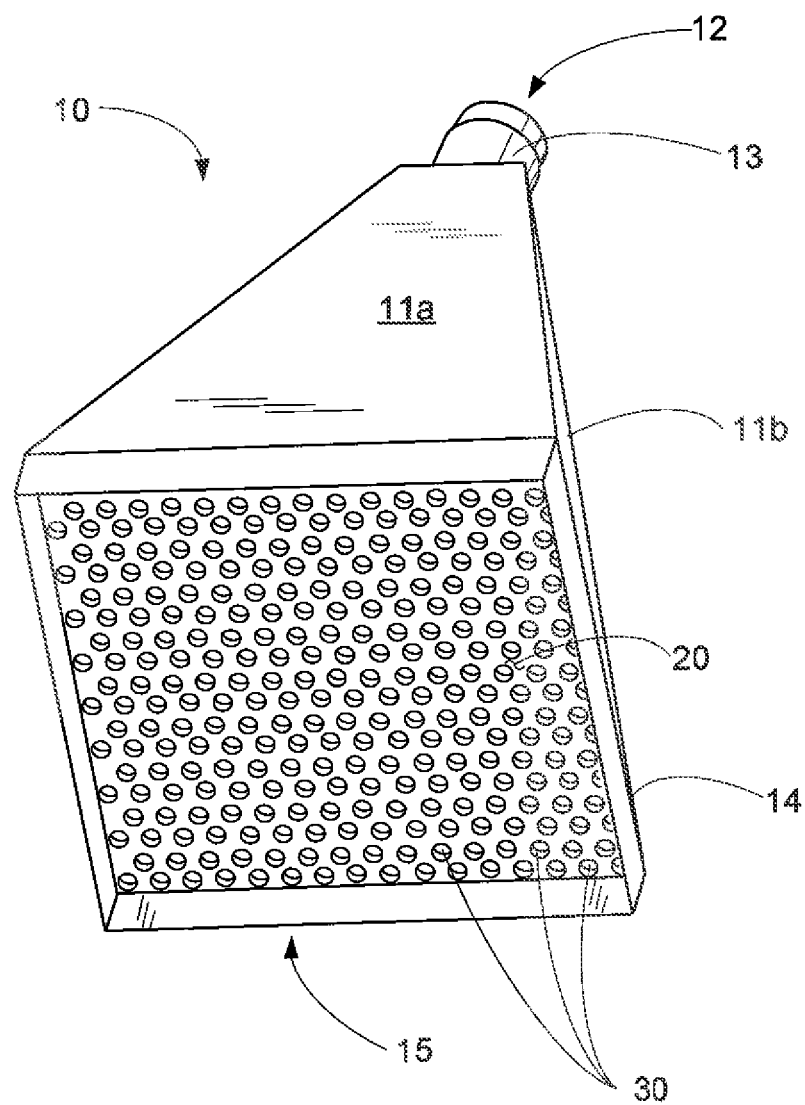
FIG. 2 is a bottom view, in perspective, of a wash hood in accordance with certain embodiments.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and the include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

All ranges disclosed herein are inclusive of the recited endpoint and independently combinable (for example, the range of "from 2 inches to 10 inches" is inclusive of the endpoints, 2 inches and 10 inches, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component, and should not be construed as requiring a particular orientation or location of the structure.

The terms "top" and "bottom" are relative to an absolute reference, i.e. the surface of the earth. Put another way, a top location is always located at a higher elevation than a bottom location, toward the surface of the earth.

The terms "horizontal" and "vertical" are used to indicate direction relative to an absolute reference, i.e. ground level. However, these terms should not be construed to require structures to be absolutely parallel or absolutely perpendicular to each other.

It should be noted that many of the terms used herein are relative terms. For example, the terms "interior", "exterior", "inward", and "outward" are relative to a center, and should not be construed as requiring a particular orientation or location of the structure.

To the extent that explanations of certain terminology or principles of the media, heat exchange media arts, heat exchange media cleaning and maintenance arts, industrial systems maintenance arts, and related arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, and Steam/its generation and use, $42^{nd}$ Edition, G. L. Tomei, Ed., Copyright 2015, The Babcock & Wilcox Company, the texts of which are hereby incorporated by reference as though fully set forth herein.

Figure 3:
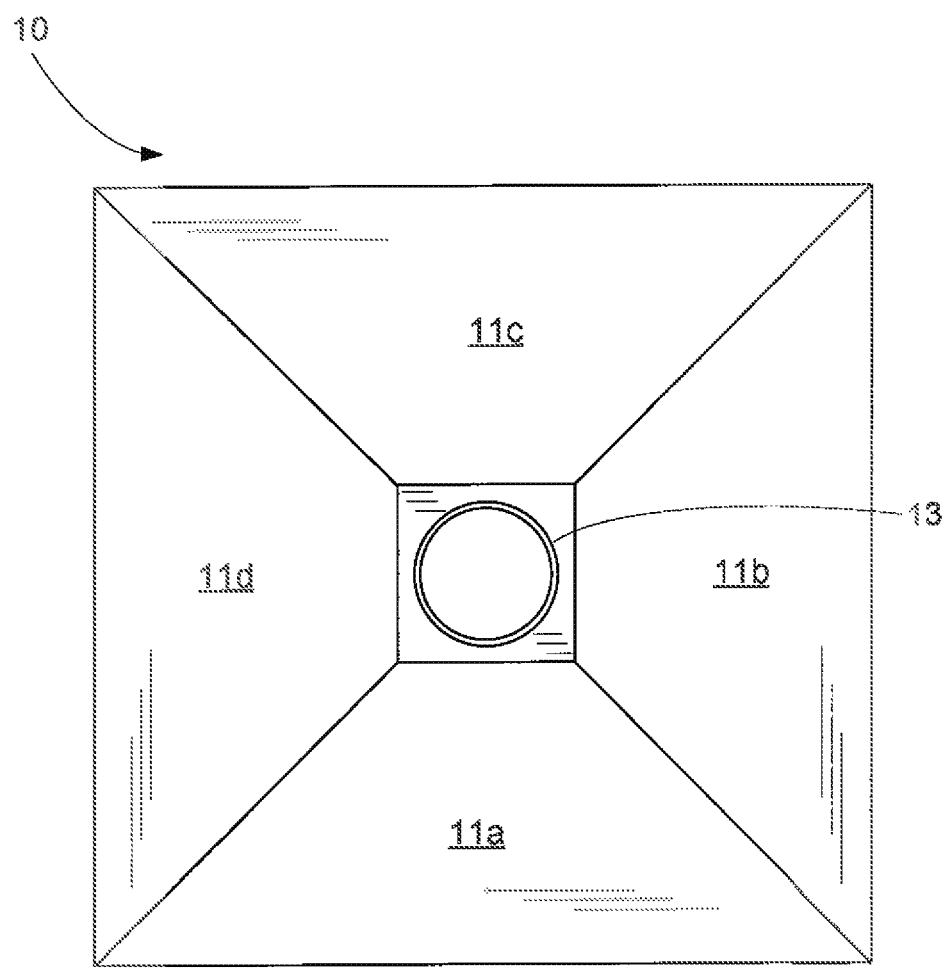
FIG. 3 is a top view of the wash hood of FIG. 1.

Turning to FIG. 1, there is shown a wash hood 10 in accordance with certain embodiments. In the embodiment shown, the wash hood 10 includes a generally pyramid-shaped hood body or housing with sides 11a, 11b, 11c and 11d (see also FIG. 3), and can be made of 304 stainless steel to minimize corrosion while providing sufficient weight to prevent the unit from lifting with fluid flowing through it. Those skilled in the art will appreciate that other shapes (e.g., square or cylindrical), and other materials of construction (e.g., plastic or aluminum), may be suitable.

Figure 4:
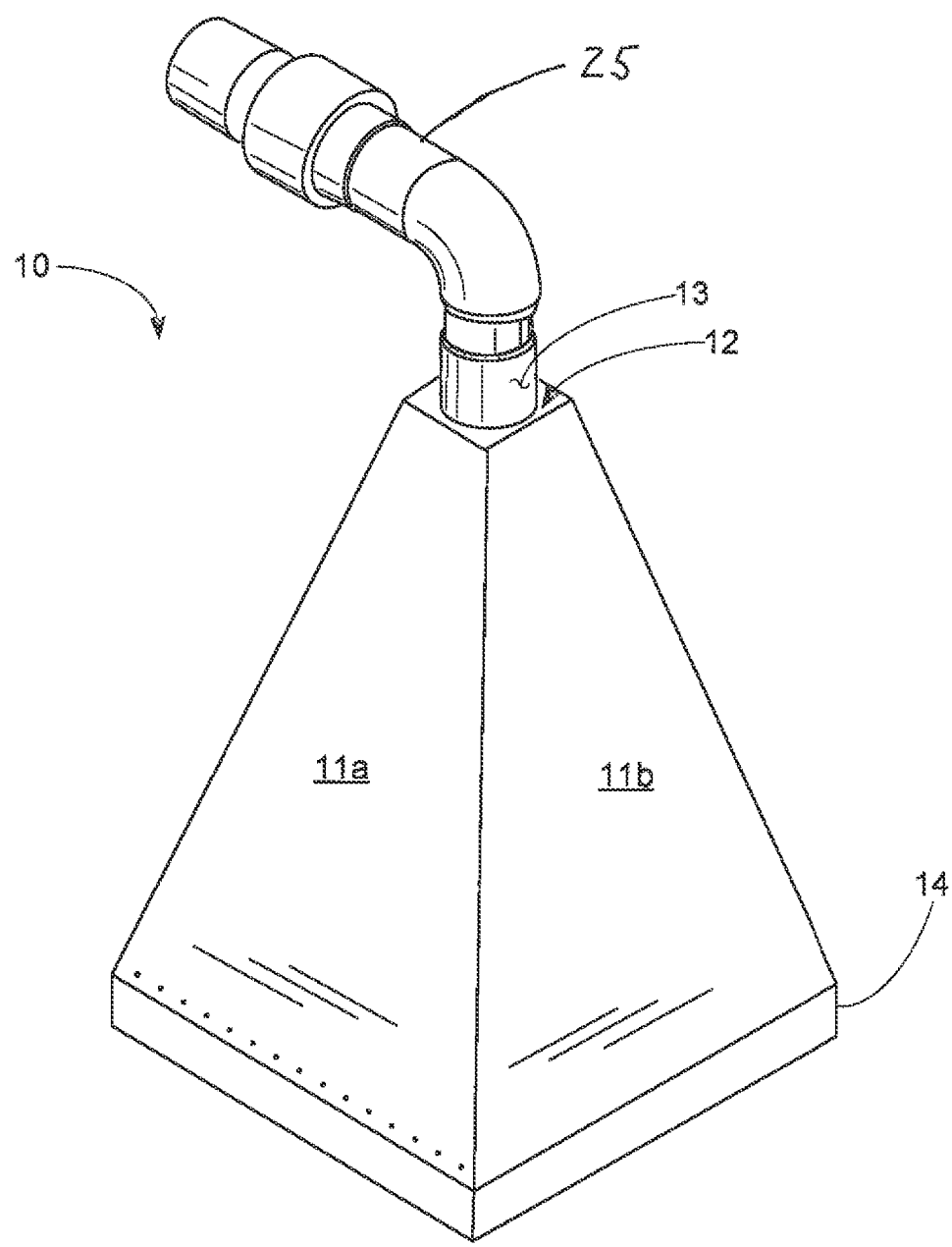
FIG. 4 is a perspective view of a wash hood shown connected to a pipe for fluid flow.

In certain embodiments, the wash hood 10 includes a fluid inlet 12. For example, the fluid inlet 12 may be a pipe 13 attached to the top of wash hood 10, that can include external threads (not shown) to receive a hose or the like 25 (see FIG. 4) in fluid communication with a fluid source, such as water under pressure. In certain embodiments, the pipe 13 can include an NPT fitting, so that the wash hood 10 can be sealingly attached to a hose such as a fire hose. A shut off valve (not shown) may be provided to enable the user to quickly and easily control the flow of fluid from the fluid source to the wash hood 10. As seen in FIG. 4, the hose or the like 25 can take about a 90° turn from the pipe 13 and thus provide a convenient grasping region for the operator to manipulate the wash hood 10. Those skilled in the art will appreciate that other fluid sources and cleaning solutions may be used under pressure, and angles of the hose or the like relative to the pipe may be applicable (e.g., 75° or 45°), may be suitable.

The wash hood 10 includes a base 14 defining a fluid outlet spaced from the fluid inlet 12. In certain embodiments, the fluid outlet 15 is much larger than the fluid inlet 12. For example, the wash hood body can taper outwardly from the fluid inlet 12 towards the fluid outlet 15 as seen in FIG. 1. In some embodiments, the fluid outlet 15 has a square or substantially square cross-section. Those skilled in the art will appreciate that other fluid outlet shapes and cross-sections may be used (e.g., cylindrical).

In order to increase the uniformity of the fluid discharged from the fluid outlet 15 of the wash hood 10, a flow distributor 20 can be provided. In certain embodiments, the flow distributor is a perforated member, such as a perforated plate welded inside the wash hood 14 near the fluid outlet 15. The perforated member should have sufficient open area to ensure uniform discharge of the fluid from the wash hood 10. Accordingly, the perforated plate 20 has a plurality of apertures 30, the number and size of which are not particularly limited, although in some embodiments an open area of between about 15-20%, preferably about 17.6%, has been found to be suitable. In certain embodiments, the apertures 30 are circular in cross-section. In other embodiments, apertures 30 may be of a different cross-section such as square or hexagonal. In certain embodiments, the number and size of the apertures 30 should be sufficient to allow the fluid to build up and spread across the flow distributor 20, thereby reducing the pressure while still covering the entire area of the flow distributor 20. One suitable diameter for each apertures is 0.191 inches. Those skilled in the art will appreciate that other flow distributors could be used, such as a series of baffles positioned in the wash hood 10 to direct the flow of fluid downwardly and out the fluid outlet 15.

In some embodiments, the media, such as heat exchange media, is monolithic or structured media, such as media having 25 to 50 cells/in$^2$, and allows for laminar flow and low pressure drop through the media. It has a series of small, channels or passageways formed therein allowing gas to pass through the structure in predetermined paths, generally along an axis parallel to the flow of gas through the heat exchange column. Exemplary structures are mullite ceramic honeycombs having 40 cells per element (outer diameter 150 mm×150 mm), as well as structures having dimensions of about 5.25"×5.25"×12.00". These blocks contain a plurality of parallel squared channels (40-50 channels per square inch), with a single channel cross section of about 3 mm×3 mm surrounded by an approximately 0.7 mm thick wall. Thus, a free cross section of approximately 60-70% and a specific surface area of approximately 850 to 1000 $m^2/m^3$ can be determined.

In certain, embodiments, the media or heat exchange media is multi-layered media, such as ceramic packing elements formed from stacks of plates having parallel ribs forming parallel grooves between them, the grooves forming channels by being contacted with the surface of an opposed plate.

The size and shape of the base 14 of the wash hood 10 can be configured to optimize media washing, depending on the particular dimensions of the media in the RTO. A 12"×12" base has been found to be suitable, for example, allowing for uniform flooding of a one square foot area of media for a given time.

In operation, once the abatement equipment has been cooled to room temperature, the wash hood 10 can be used to wash media by placing the wash hood 10 over a region of media, and flowing fluid. (e.g., water) through the wash hood. The fluid will also help to dissolve or wash away any water soluble contaminants. This is achieved by the flooding of: a specific area with the wash hood, yielding higher contact area and higher rate of removal. A flow rate of at least about 50 gallons per minute over a one square foot area of media for 30 seconds has been found to be suitable for a thorough flushing of the media bed. The mechanical force of the water will help to loosen any debris such as silica or other powdery build-up on the media. The flow rate should be sufficient to allow the fluid to accumulate on the flow distributor 20, disperse over the entire area of the flow distributor 20, and ultimately discharge through the apertures 30 in the flow distributor and out the wash hood 10 without flooding the hood itself. This is also a function of the number and size of the apertures 30 in the flow distributor 20. The wash hood 10 can then be moved to the next region of media and the process repeated until the entire bed has been washed. The debris is flushed out the bottom of the media bed to be disposed of appropriately.

In certain embodiments, the media can be pre-wetted by first quickly moving the wash hood 10 across the media bed. This helps soak and loosen any accumulated contaminants and may reduce the amount of fluid needed during the washing procedure, and also enhance the effectiveness of the wash. After the entire bed has been pre-wetted, the flushing of the bed can then begin. The wash procedure can all be carried out manually.

In certain embodiments, a cleaning agent can be applied to the media prior to the aforementioned washing.

In some embodiments, the fluid flushed from the media bed can be monitored for particulate content; when it is free or substantially free of particulate material, the wash hood can be moved to the next region of the media bed for flushing.

Since the wash hood 10 is placed on the media during flushing, the operator is not burdened with holding and supporting a heavy hose during spraying as was the case with the conventional procedure. The wash hood. 10 and method of washing also help prevent water loss from splashing, which helps keep water off of the insulation, on the combustion chamber walls, especially when washing at the edges as well as more efficient use of the fluid. Finally the wash hood helps the ergonomics of the job by allowing the personnel cleaning the media bed to set the device down while washing an area, limiting the amount of physical exertion that could result in injury and/or human error. In addition, the is a higher contact area between the wash hood 10 and the media compared to conventional hose spraying, resulting in a higher rate of particulate removal.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A wash hood for washing contaminants from heat-exchange media, comprising a hood body having a fluid inlet and a fluid outlet spaced from said fluid inlet, and a flow distributor in said hood body having a surface and a plurality of apertures, the number and size of which results in an open area of from about 15% to about 20% and is configured to cause fluid to accumulate on said flow distributor surface and flood a region of heat exchange media when placed over said heat exchange media.

2. The wash hood of claim 1, wherein said apertures in said flow distributor are circular.

3. The wash hood of claim 1, wherein said hood body has a pyramid shape.

4. The wash hood of claim 1, wherein said fluid outlet has a square or substantially square cross-section.

5. The wash hood of claim 1, wherein said wash hood is comprised of stainless steel material.

6. A wash hood for washing contaminants from heat-exchange media, comprising a hood body having a fluid inlet and a fluid outlet spaced from said fluid inlet, and a flow distributor in said hood body having a first surface facing said fluid outlet and a second surface opposite said first surface, and having a plurality of apertures, the number and size of which results in an open area of from about 15% to about 20% and is configured to cause fluid flowing from said fluid inlet to accumulate on said flow distributor second surface and flood a region of heat exchange media when placed over said heat exchange media.

7. The wash hood of claim 6, wherein said apertures in said flow distributor are circular.

8. The wash hood of claim 6 wherein said hood body has a pyramid shape.

9. The wash hood of claim 6, wherein said fluid outlet has a square or substantially square cross-section.

10. The wash hood of claim 6, wherein said wash hood is comprised of stainless steel material.

\* \* \* \* \*